United States Patent [19]
Koorneef et al.

[11] 3,855,630
[45] Dec. 17, 1974

[54] COMBINED MAGNETIC HEAD FOR RECORDING AND PLAYBACK HAVING ADJUSTABLE END FACES

[75] Inventors: Jacob Koorneef; Jan Antoon Ludolf Potgiesser; Anthonie Walraven, all of Emmasingel, Eindhoven, Netherlands

[73] Assignee: U.S. Philips Corporation, New York, N.Y.

[22] Filed: June 25, 1973

[21] Appl. No.: 373,509

[30] Foreign Application Priority Data

July 26, 1972 Netherlands .......................... 721323

[52] U.S. Cl. .................. 360/113, 360/119, 360/122, 360/125

[51] Int. Cl. ............................................... G11b 5/22

[58] Field of Search ........... 179/100.2 CH, 100.2 C; 340/174.1 F; 346/74 MC; 360/113, 119, 122, 128, 125

[56] References Cited

UNITED STATES PATENTS

| | | | |
|---|---|---|---|
| 2,902,544 | 9/1959 | Barry | 179/100.2 C |
| 3,480,935 | 11/1969 | Springer | 179/100.2 C |
| 3,485,958 | 12/1969 | Bos et al. | 340/174.1 F |
| 3,493,694 | 2/1970 | Hunt | 340/174.1 C |
| 3,686,467 | 8/1972 | Camras | 179/100.2 CH |
| 3,706,861 | 12/1972 | Giel | 360/103 |

*Primary Examiner*—Alfred H. Eddleman
*Attorney, Agent, or Firm*—Frank R. Trifari

[57] ABSTRACT

A magnetic head for recording information on a track having a first width of a recording medium and playing back information from a track having a second smaller width, for which purpose one poleshoe of the head consists of three parts, the two extreme ones of which can be moved away from the recording medium during a playback operation.

3 Claims, 4 Drawing Figures

COMBINED MAGNETIC HEAD FOR RECORDING AND PLAYBACK HAVING ADJUSTABLE END FACES

The invention relates to a magnetic head for recording information on a track having a first width of a magnetizable recording medium and playing back information on a track having a second smaller width of a magnetizable recording medium, comprising a core of a magnetizable material which is provided with an electric winding and which on the side which is destined for cooperation with a recording medium, is provided with two oppositely located end faces which enclose a recording gap.

In certain systems for data storage the recording medium consists, for example, of a strip of magnetizable material which is provided on a carrier, for example, a tape or a disc. The information may be recorded in the form of bits and played back by means of a magnetic head. When the magnetic head is energized by electric pulses supplied to the winding, a magnetic field is produced at the area of the recording gap which is capable of magnetising the part of the recording medium present opposite to the recording gap. The magnetic head is operative over a given width of the medium, the so-called track, a device being present to produce a relative movement of the medium relative to the head so as to be able to record information throughout the length of the medium. When information is stored on a given track, all data, possibly recorded earlier on said track, is erased before the new information is recorded.

It is possible, however, that as a result of a wrong positioning of the head relative to the desired track, the bits recorded during a preceding recording operation, are not erased entirely. When during a playback operation the head is not positioned quite correctly either and such a track of earlier recorded information is scanned, the non-erased bits will also be played back.

A solution to the above problem has been sought by using a magnetic head combination which records a track with a width which is larger than the width over which there is played back. Also in the case of a positioning which is not quite correct, the playback track then falls entirely within the last written track.

An example of such a solution is known from the U.S. Pat. No. 3,171,107. In the head described in said patent, two blocks of magnetic material are present in the recording gap, each block having a length which is smaller than the overall dimension of the gap in said direction. The blocks are present on the two ends of the gap. During a recording operation the material of the blocks is saturated so that recording is carried out throughout the full gap. During a playback operation the material of the blocks is not saturated and only information is played back over the part of the gap between the two blocks.

A drawback of this known head is, however, that the operation is little effective. The head is to be considered as one central head which is flanked by two extra heads. When during playback the gaps of the extreme heads are short-circuited, the gap of the central head will also be partly short-circuited due to the magnetic coupling inevitably present between the central head and the extreme heads.

It is the object of the invention to provide a construction of a double gap magnetic head for recording information on a wide track and playing back information on a narrow track which does not exhibit the above-mentioned drawback.

For that purpose the magnetic head according to the invention is characterized in that at least one end member consists of three parts extending transverse to the recording gap, in which for a playback operation the two extreme parts are relatively movable relative to the central part in a direction away from a recording medium to be scanned, the overall width of the three parts being equal to the said first width, the width of the central part being equal to the said second width.

The operation of the magnetic head according to the invention is based on the fact that the amplitude of a played back signal depends amongst others upon the distance from the recording gap to the medium in relation to the wavelength of the played back signal. Generally a small movement is sufficient to produce a great variation in amplitude of the played back signal. The head is used so that upon writing information the three parts of the end member in question have exactly the same distance to the recording medium so that information is written throughout the length of the recording gap. Preceding a playback operation, the extreme parts are moved away from the recording medium over a small distance so that the amplitude of the signal which is played back at the area of the extreme parts decreases strongly. The width of the track over which playback is carried out is thus reduced.

The operation of the head is most effective when, according to a preferred embodiment of the magnetic head according to the invention, both end members consist of three parts extending transverse to the recording gap, in which for a playback operation the two extreme parts of each end member are relatively movable relative to the central part in a direction away from a recording medium to be played back.

The movement of the extreme parts of the end members may be carried out in various manners within the scope of the invention. For example, a construction is possible in which a small movement of the extreme parts is realized by influencing the geometric dimensions of the material which supports the extreme parts of the end member by means of thermal energy, light or magnetostriction.

A further preferred embodiment of the magnetic head according to the invention, however, is characterized in that one or more electrostrictive transducers are present for relatively moving the extreme parts of the end member and end members, respectively, with respect to the central part.

The invention will be described in greater detail, by way of example, with reference to the drawing.

Figures 1, 2, 3:
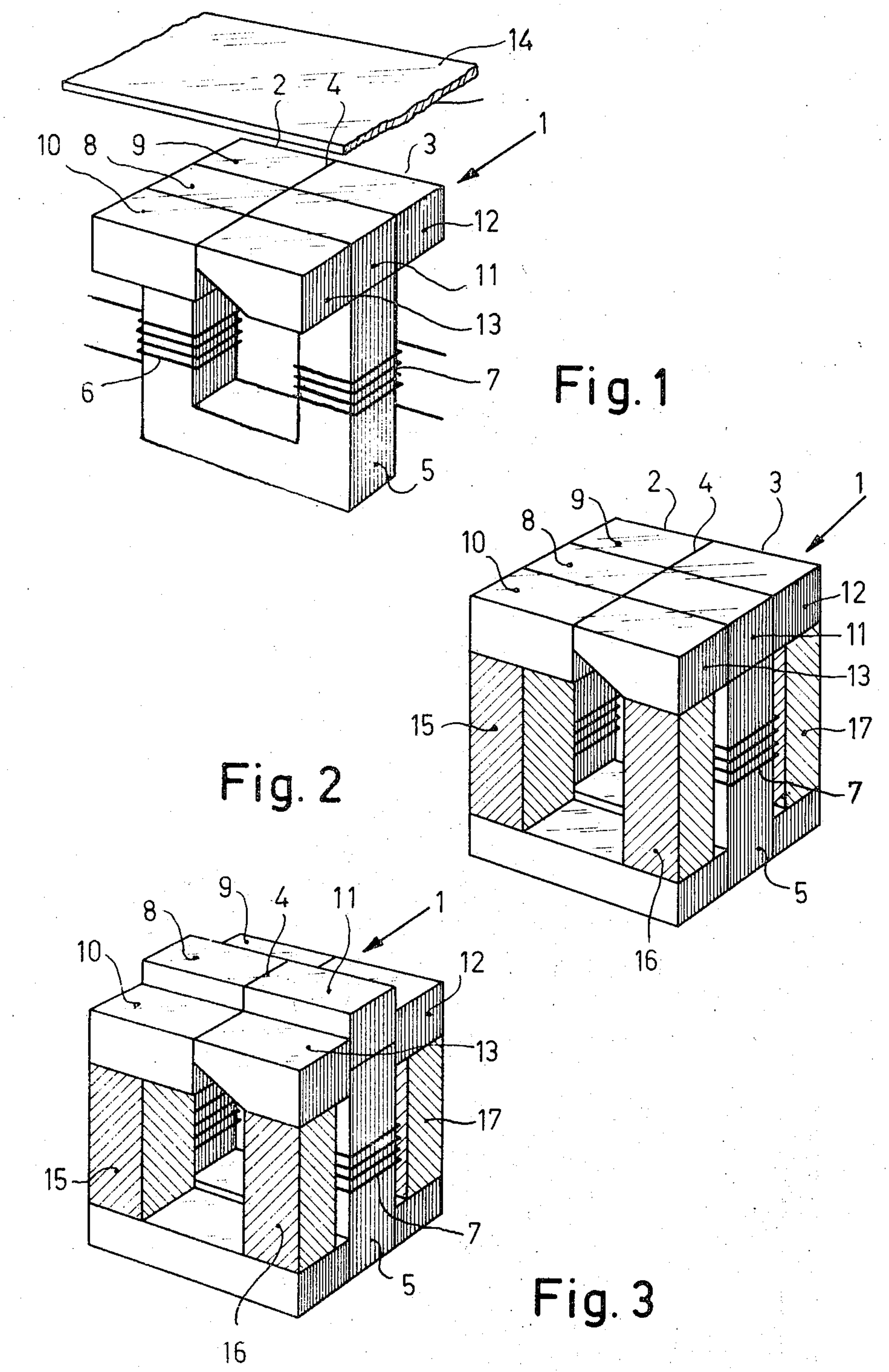
FIG. 1 shows a magnetic head having a front member which consists of three parts.
FIG. 2 shows the magnetic head of FIG. 1 comprising electrostrictive elements.
FIG. 3 shows the magnetic head of FIG. 2 during a playback operation.

FIG. 1 shows a magnetic head 1 which consists of two end members 2 and 3 which enclose a recording gap 4 and a closing yoke 5 which comprises an electric winding 6 for writing information and an electric winding 7 for playing back information. The end member 2 consists of a central part 8 and two extreme parts 9 and 10, while the end member 3 consists of a central part 11 and two extreme parts 12 and 13. Energisation of the recording winding 6 produces a magnetic flux in the magnetic circuit formed by the end members 2 and 3 and the closing yoke 5. A part of the flux thus produced is scattered near the gap 4 and can thus influence the magnetizable medium 14. Conversely, the flux produced by a magnetized part of the medium 14 when the head 1 and the medium 14 are moved relative to each other can produce a varying magnetic flux within the playback winding 7 so that a voltage is induced therein.

During a recording operation, the parts 8, 9, 10, 11, 12 and 13 of the end members 2 and 3 are located precisely in one plane and information is written throughout the gap 4.

According to the invention, the head 1 is constructed so that the width over which it can play back information is smaller than the width over which it can write information. For that purpose, as shown in FIG. 2, the head 1 is provided with electrostrictive transducers 15, 16, 17 and 18 (18 not visible) which support the end members 2 and 3 at the area of the extreme parts.

As is known, electrostrictive materials can vary their shape under the influence of an electric field. For example, a flat plate of electrostrictive material having a direction of polarisation at right angles to the plane of the plate will show a certain extent of expansion or shrinkage, dependent upon the value and the polarity of the applied voltage when electrodes are provided on the upper and lower side and connected to a voltage source. A suitable material in this respect is a modified lead-zirconate-titanate known as Piezoxide 5.

The transducers 15, 16, 17 and 18 are provided with electrodes and connected to a voltage source in such a manner (not shown) that during a playback operation the electrostrictive transducers show such a shrinkage that the parts 9, 10, 12 and 13 connected thereto are moved away from the record carrier over a small distance relative to the parts 8 and 11. This distance is, for example, 5 to 10 microns, for which purpose a control voltage of a few tens of volts is required. The above-described situation is shown in FIG. 3 on a strongly exaggerated scale. By retracting the extreme parts of the end members, a sufficiently large output voltage is produced only by the signal which is played back with the part of the recording gap 4 which is present between the parts 8 and 11.

Figure 4:
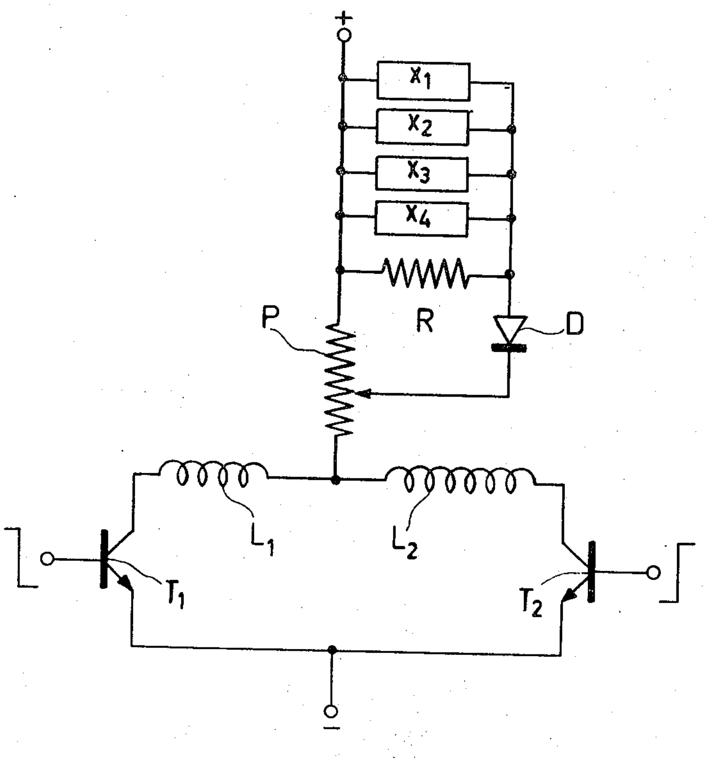
FIG. 4 shows a diagram for the connection of the magnetic head according to the invention.

FIG. 4 serves to illustrate a manner in which a magnetic head according to the invention can be connected.

The circuit shown is constructed so that when a current flows through the write winding of the head, the electrostrictive bending elements are automatically energized. For that purpose the write winding comprises a centre tap which divides the write winding into the windings $L_1$ and $L_2$. Upon recording binary information, the polarity of the write signal is representative of the information to be written. When the polarity of the write signal is positive, for example, the switching transistor $T_1$ is conductive and the write current flows through the winding $L_1$ to the potentiometer P. When the polarity is negative, for example, the switching transistor $T_2$ is conductive and the write current flows through the winding $L_2$ to the potentiometer. So independently of the polarity of the write signal, current always flows in the same direction through P. By means of the potentiometer circuit a given voltage can be adjusted across the bending elements $X_{1,2,3,4}$, which voltage determines the distance over which the extreme parts of the end member are moved relative to the central part. In series with the electrostrictive bending elements $X_{1,2,3,4}$, a diode D is connected which ensures that when the write current is interrupted, the current through the potentiometer circuit cannot start flowing in the reverse direction. A discharge resistor R is connected parallel to $X_{1,2,3,4}$. By means of the value hereof, the time can be controlled at which the bending elements $X_1$, $X_2$, $X_3$, $X_4$ are discharged, that is to say the time is adjustable in which $X_{1,2,3,4}$ again reach the rest position after energization. So in the case described, the position shown in FIG. 3 is the rest position (playback position). By energizing the bending elements, the outermost parts and the innermost parts are positioned in one plane (the write position).

It is to be noted that the energization of the bending elements may also be carried out by means of a separate current source. A drawback is that in that case more connections to the head are necessary but an advantage is that a current source may be chosen which is specially suitable for operating the bending elements, while same can be energized either during writing or during playing back.

What is claimed is:

1. A magnetic head for recording information on a track having a first width of a magnetizable recording medium and playing back information on a track having a second smaller width of a magnetizable recording medium, comprising a core of magnetizable material which is provided with an electric winding and which, on the side which is destined for cooperation with a recording medium, is provided with two end members which enclose a recording gap at least one end member comprising three parts extending transverse to the recording gap, said three parts extending transverse to the recording gap comprising a central part and two extreme parts disposed on opposite sides of said central part, means for supporting said extreme parts for movement during playback operation relative to the central part in a direction away from the longitudinal axis of the recording medium, means for moving said extreme parts responsive to an electromotive force selectively during playback operation, relative to the central part in a direction away from the longitudinal axis of a recording medium to be scanned, the overall width of the three parts being equal to the first width, the width of the central part being equal to the said second width.

2. A magnetic head as claimed in claim 1, characterized in that both end members consist of three parts extending transverse to the recording gap and means for moving all of said extreme parts relative to the associated central part in a direction away from a recording medium to be played back.

3. A magnetic head as claimed in claim 2, characterized in that said means comprises at least one electrostrictive transducer for relatively moving said extreme parts of said end members with respect to the central part.

* * * * *

PO-1050
(5/69)

UNITED STATES PATENT OFFICE
CERTIFICATE OF CORRECTION

Patent No. 3855630 Dated December 17, 1974

Inventor(s) Jacob Koorneef; Jan Antoon Ludolf Potgiesser; Anthonie Walraven

It is certified that error appears in the above-identified patent and that said Letters Patent are hereby corrected as shown below:

In the heading under Foreign Application Priority Data

[30] delete "721323" and insert --7210323--.

Signed and sealed this 11th day of March 1975.

(SEAL)
Attest:

RUTH C. MASON
Attesting Officer

C. MARSHALL DANN
Commissioner of Patents
and Trademarks